US008854680B2

(12) United States Patent
Bellert (10) Patent No.: US 8,854,680 B2
(45) Date of Patent: Oct. 7, 2014

(54) SYSTEMS AND METHODS FOR OPTIMAL MEMORY ALLOCATION UNITS

(75) Inventor: Darrell Eugene Bellert, Boulder, CO (US)

(73) Assignee: Konica Minolta Laboratory U.S.A., Inc., San Mateo, CA (US)

( * ) Notice: Subject to any disclaimer, the term of this patent is extended or adjusted under 35 U.S.C. 154(b) by 1165 days.

(21) Appl. No.: 12/209,046

(22) Filed: Sep. 11, 2008

(65) Prior Publication Data

US 2010/0060934 A1    Mar. 11, 2010

(51) Int. Cl.
*G06K 15/02*    (2006.01)
*G06T 1/60*    (2006.01)
*G06F 3/12*    (2006.01)

(52) U.S. Cl.
CPC ............ *G06T 1/60* (2013.01); *G06F 3/1244* (2013.01); *G06F 3/122* (2013.01)
USPC ........................... 358/1.17; 358/1.16; 382/305

(58) Field of Classification Search
USPC ............... 358/1.14, 1.16, 1.17, 523; 382/305
See application file for complete search history.

(56) References Cited

U.S. PATENT DOCUMENTS

| | | | |
|---|---|---|---|
| 4,782,398 A | 11/1988 | Mita | |
| 5,010,515 A | 4/1991 | Torborg et al. | |
| 5,041,920 A | 8/1991 | Hayes et al. | |
| 5,319,778 A | 6/1994 | Catino | |
| 5,471,579 A | 11/1995 | Kimura et al. | |
| 5,477,257 A | 12/1995 | Murata | |
| 5,479,587 A | 12/1995 | Campbell et al. | |
| 5,491,808 A | 2/1996 | Geist, Jr. | |
| 5,502,462 A | 3/1996 | Mical et al. | |
| 5,542,031 A | 7/1996 | Douglass et al. | |
| 5,577,243 A | 11/1996 | Sherwood et al. | |
| 5,646,670 A | 7/1997 | Seto et al. | |
| 5,739,842 A | 4/1998 | Murata | |
| 5,760,811 A | 6/1998 | Seto et al. | |
| 5,778,414 A | 7/1998 | Winter et al. | |
| 5,793,937 A | 8/1998 | Chura et al. | |
| 5,864,342 A | 1/1999 | Kajiya et al. | |

(Continued)

FOREIGN PATENT DOCUMENTS

| | | |
|---|---|---|
| JP | 02-275525 A | 11/1990 |
| JP | H8-202611 A | 8/1996 |

(Continued)

OTHER PUBLICATIONS

U.S. Appl. No. 11/394,783, filed Mar. 31, 2006.

(Continued)

*Primary Examiner* — Thomas D Lee
(74) *Attorney, Agent, or Firm* — Osha Liang LLP (57) ABSTRACT

Methods for determining an optimal memory allocation unit size for a framebuffer in a single memory pool comprising frame buffer memory and display list memory on printing devices are presented. In some embodiments, a method for determining an optimal allocation unit size for memory allocation units allocated from a memory pool in response to a memory allocation request for a pixmap comprises determining the amount of unutilized memory when the pixmap is stored using a plurality of memory allocation unit sizes, wherein the memory allocation unit sizes are an integral multiple of a base memory allocation unit; and selecting a memory allocation unit size from the plurality of memory allocation unit sizes based on criteria related to the amount of unutilized memory.

20 Claims, 8 Drawing Sheets

(56) References Cited

U.S. PATENT DOCUMENTS

| | | | |
|---|---|---|---|
| 5,870,534 A | 2/1999 | Tsuchitoi | |
| 5,913,018 A | 6/1999 | Sela | |
| 5,946,334 A | 8/1999 | Ema et al. | |
| 5,959,867 A | 9/1999 | Speciner et al. | |
| 5,978,893 A | 11/1999 | Bakshi et al. | |
| 5,999,709 A | 12/1999 | Fiala et al. | |
| 6,031,995 A | 2/2000 | George | |
| 6,040,917 A * | 3/2000 | Campbell et al. | 358/1.17 |
| 6,057,847 A | 5/2000 | Jenkins | |
| 6,092,171 A | 7/2000 | Relph | |
| 6,111,582 A | 8/2000 | Jenkins | |
| 6,192,157 B1 | 2/2001 | Prebble | |
| 6,215,513 B1 | 4/2001 | Ashikaga | |
| 6,249,793 B1 | 6/2001 | Printezis et al. | |
| 6,252,675 B1 | 6/2001 | Jacobs | |
| 6,326,964 B1 | 12/2001 | Snyder et al. | |
| 6,366,289 B1 | 4/2002 | Johns | |
| 6,369,911 B1 | 4/2002 | Hattori | |
| 6,472,946 B2 | 10/2002 | Takagi | |
| 6,476,847 B2 | 11/2002 | Satoh et al. | |
| 6,490,670 B1 | 12/2002 | Collins et al. | |
| 6,498,617 B1 | 12/2002 | Ishida et al. | |
| 6,603,116 B2 | 8/2003 | Niito | |
| 6,643,759 B2 | 11/2003 | Andersson et al. | |
| 6,701,420 B1 | 3/2004 | Hamilton et al. | |
| 6,707,563 B1 | 3/2004 | Barry et al. | |
| 6,731,317 B2 | 5/2004 | Ema et al. | |
| 6,775,032 B2 | 8/2004 | Jacobs | |
| 6,778,292 B1 | 8/2004 | Someno | |
| 6,809,730 B2 | 10/2004 | Howson | |
| 6,860,203 B2 | 3/2005 | Danilo et al. | |
| 7,009,729 B2 | 3/2006 | Fujita | |
| 7,031,025 B1 | 4/2006 | He et al. | |
| 7,038,671 B2 | 5/2006 | Willis et al. | |
| 7,064,859 B1 | 6/2006 | Dittrich et al. | |
| 7,113,302 B2 | 9/2006 | Reddy et al. | |
| 7,196,710 B1 | 3/2007 | Fouladi et al. | |
| 7,428,075 B2 | 9/2008 | Johnston | |
| 7,447,836 B2 | 11/2008 | Zhang et al. | |
| 7,697,168 B2 | 4/2010 | Ozawa et al. | |
| 7,715,031 B2 | 5/2010 | Westervelt et al. | |
| 8,045,215 B2 | 10/2011 | Jacobsen et al. | |
| 8,228,555 B2 | 7/2012 | Prebble | |
| 8,526,049 B2 | 9/2013 | Guarnieri et al. | |
| 2001/0015820 A1 | 8/2001 | Conrad et al. | |
| 2001/0030769 A1 | 10/2001 | Jacobs | |
| 2001/0030796 A1 | 10/2001 | Yao | |
| 2001/0055129 A1 | 12/2001 | Shimizu | |
| 2002/0063894 A1 | 5/2002 | Campbell et al. | |
| 2002/0078298 A1 | 6/2002 | Jeddeloh | |
| 2002/0093669 A1 | 7/2002 | Campbell et al. | |
| 2002/0097433 A1 | 7/2002 | Chang et al. | |
| 2002/0120826 A1 | 8/2002 | Venkatraman et al. | |
| 2004/0044873 A1 | 3/2004 | Wong et al. | |
| 2004/0098544 A1 | 5/2004 | Gaither et al. | |
| 2004/0120007 A1 | 6/2004 | Jacobsen et al. | |
| 2004/0156079 A1 | 8/2004 | Marshall et al. | |
| 2004/0193775 A1 | 9/2004 | Van Doren et al. | |
| 2004/0207861 A1 | 10/2004 | Hattori | |
| 2004/0233207 A1 | 11/2004 | Morphet | |
| 2005/0044549 A1 | 2/2005 | Morikawa et al. | |
| 2005/0067498 A1 | 3/2005 | Smith | |
| 2006/0001467 A1 | 1/2006 | Fujino et al. | |
| 2006/0069898 A1 | 3/2006 | Patel et al. | |
| 2006/0077193 A1 | 4/2006 | Thielemans et al. | |
| 2006/0288187 A1 | 12/2006 | Burugula et al. | |
| 2007/0146785 A1 | 6/2007 | Akiyama et al. | |
| 2007/0153247 A1 | 7/2007 | Nagasaka | |
| 2007/0229900 A1 | 10/2007 | Guarnieri et al. | |
| 2007/0236733 A1 | 10/2007 | Guarnieri et al. | |
| 2008/0002018 A1 | 1/2008 | Johnston | |
| 2008/0002228 A1 | 1/2008 | Johnston | |
| 2008/0002229 A1 | 1/2008 | Johnston | |
| 2008/0007744 A1 * | 1/2008 | Johnston | 358/1.5 |
| 2008/0007745 A1 | 1/2008 | Johnston | |
| 2008/0162863 A1 | 7/2008 | McClure et al. | |
| 2009/0086254 A1 | 4/2009 | Duong | |
| 2009/0172336 A1 | 7/2009 | Schmidt | |
| 2009/0244593 A1 | 10/2009 | Prebble | |
| 2009/0249017 A1 | 10/2009 | Prebble | |
| 2010/0053179 A1 | 3/2010 | Bellert | |
| 2010/0079809 A1 | 4/2010 | Bellert | |

FOREIGN PATENT DOCUMENTS

| | | |
|---|---|---|
| JP | 2000-141811 A | 5/2000 |
| JP | 2004-038527 A | 2/2004 |
| JP | 2004-054933 A | 2/2004 |
| JP | 2005-073004 | 3/2005 |
| JP | 2005-190487 | 7/2005 |
| JP | 2005-327255 A | 11/2005 |
| JP | 2009-245437 | 10/2009 |

OTHER PUBLICATIONS

Office Action dated Aug. 18, 2009, in U.S. Appl. No. 11/394,783, filed Mar. 31, 2006.

Office Action dated Apr. 13, 2010, in U.S. Appl. No. 11/394,783, filed Mar. 31, 2006.

Office Action dated Nov. 26, 2010, in U.S. Appl. No. 11/394,783, filed Mar. 31, 2006.

Office Action dated May 23, 2011, in U.S. Appl. No. 11/394,783, filed Mar. 31, 2006.

U.S. Appl. No. 11/515,337, filed Aug. 31, 2006.

Office Action dated Mar. 21, 2011, in U.S. Appl. No. 11/515,337, filed Aug. 31, 2006.

Office Action dated Sep. 12, 2011, in U.S. Appl. No. 11/515,337, filed Aug. 31, 2006.

Office Action dated Jan. 12, 2012, in U.S. Appl. No. 11/515,337, filed Aug. 31, 2006.

U.S. Appl. No. 12/059,627, filed Mar. 31, 2008.

Office Action dated Nov. 23, 2011, in U.S. Appl. No. 12/059,627, filed Mar. 31, 2008.

U.S. Appl. No. 12/059,692, filed Mar. 31, 2008.

Office Action dated Oct. 7, 2010, in U.S. Appl. No. 12/059,692, filed Mar. 31, 2008.

Office Action dated Apr. 6, 2011, in U.S. Appl. No. 12/059,692, filed Mar. 31, 2008.

U.S. Appl. No. 12/201,735, filed Aug. 29, 2008.

Office Action dated Apr. 27, 2011, in U.S. Appl. No. 12/201,735, filed Aug. 29, 2008.

Office Action dated Sep. 30, 2011, in U.S. Appl. No. 12/201,735, filed Aug. 29, 2008.

U.S. Appl. No. 12/242,668, filed Sep. 30, 2008.

Office Action dated Jul. 1, 2011, in U.S. Appl. No. 12/242,668, filed Sep. 30, 2008.

Office Action dated Feb. 9, 2012, in U.S. Appl. No. 12/242,668, filed Sep. 30, 2008.

Notification of Reasons for Refusal mailed by the Japenese Patent Office in Feb. 19, 2013, in Japanese patent application No. 2009-081519.

Office Action dispatched Jun. 18, 2013 in Japenese patent application No. 2009-222772.

Office Action dated Jan. 16, 2013, in U.S. Appl. No. 11/394,783, filed Mar. 31, 2006.

Notice of Allowance dated Apr. 22, 2013, in U.S. Appl. No. 11/394,783, filed Mar. 31, 2006.

Office Action dated Sep. 7, 2012, in U.S. Appl. No. 11/515,337, filed Aug. 31, 2005.

Office Action dated Jun. 10, 2013, in U.S. Appl. No. 11/515,337, filed Aug. 31, 2006.

Notice of Allowance dated Mar. 23, 2012, in U.S. Appl. No. 12/059,627, filed Mar. 31, 2003.

Office Action dated Dec. 11, 2012, in U.S. Appl. No. 12/059,692, filed Mar. 31, 2008.

Office Action dated May 15, 2013, in U.S. Appl. No. 12/059,692, filed Mar. 31, 2008.

Office Action dated Jul. 2, 2012, in U.S. Appl. No. 12/201,735, filed Aug. 29, 2008.

(56) References Cited

OTHER PUBLICATIONS

Office Action dated Feb. 26, 2013, in U.S. Appl. No. 12/201,735, filed Aug. 29, 2003.
Office Action dated Aug. 17, 2012, in U.S. Appl. No. 12/242,668, filed Sep. 30, 2008.
Office Action, dated Dec. 10, 2012, in U.S. Appl. No. 12/242,666, filed Sep. 30, 2008.
Office Action dated Jun. 14, 2013, in U.S. Appl. No. 12/242,663, filed Sep. 30, 2008.
Notification of Refusal with English language translation mailed by the Japanese Patent Office on Jul. 16, 2013, in counterpart Japanese Application No. 2009-192942.
Notification of Reasons for Refusal with English language translation mailed by the Japanese Patent Office on Jun. 18, 2013, in counterpart Japanese Application No. 2009-222772.
Advisory Action mailed by the USPTO on Aug. 21, 2013, in counterpart U.S. Appl. No. 12/201,735.
Office Action mailed by the USPTO on Dec. 3, 2013, in counterpart U.S. Appl. No. 12/201,735.
Office Action mailed by the USPTO on Nov. 27, 2013, in counterpart U.S. Appl. No. 12/242,668.
Notification of Refusal with English language translation mailed by the Japanese Patent Office on Dec. 10, 2013, in counterpart Japanese Application No. 2009-206817.

* cited by examiner

742
Calculate the maximum number of scanlines ($S_{max}$) that will fit in the current super-block. Choose the highest integer $S_{max}$ for which:
$$S_{max} \leq \frac{(i * B)}{S} \text{ is true.}$$

744
Calculate unutilized space at the end of each super-block
$$W_B = ((i * B) \bmod S)$$

746
Calculate the minimum number of super-blocks (Z) to hold pixmap
Choose the smallest integer Z for which $Z \geq \frac{M}{S_{max}}$

748
Calculate unutilized space in the last super-block,
$$W_L = (i * B) - (M * S) + [(Z - 1) * S_{max} * S]$$

749
Calculate total unutilized space for superblock size $i * B$,
$$W_i = [(Z - 1) * W_B] + W_L$$

FIG. 8

SYSTEMS AND METHODS FOR OPTIMAL MEMORY ALLOCATION UNITS

BACKGROUND

1. Technical Field

The present disclosure pertains to the field of printing and in particular, to systems and methods for determining optimal memory allocation units to facilitate memory management in framebuffers.

2. Description of Related Art

Document processing software allows users to view, edit, process, store, and print documents conveniently. However, before a document can be printed, pages in the document are often described in a page description language ("PDL"). As used in this document PDL's include languages used to describe pages in a document such as PostScript, Adobe PDF, HP PCL, Microsoft XPS, and variants thereof. PDL descriptions provide a high-level portrayal of each page in a document and are often translated to a series of lower-level printer-specific commands when the document is being printed—a process termed rasterization. Although the rasterization process may be complex and depend on the features and capabilities offered by a particular printer, flexible and portable general-purpose rasterization schemes may allow printer performance optimizations based on available memory, desired print speed, cost, and other criteria.

Traditionally, memory in printing systems has been organized in two distinct pools comprising display list memory and frame buffer memory. Display list memory typically holds display list objects for rasterization, while the frame buffer memory typically holds image data specifying marks to be made on a printed page. A bitmap is a type of memory organization used to store digital images, in which each pixel is assigned a single bit (i.e. the pixel is either "on" or "off"). The term pixmap (or pixel map) is used to denote a raster image that can exist at a number of bit depths. Because of the separate nature of the two pools, display list memory cannot typically be used for frame buffer purposes, and vice versa. Therefore, print failures can occur due to insufficient memory in one pool even if there is sufficient available memory in the other pool. Moreover, the use of separate routines to manage the two distinct pools may make it difficult to modify and maintain the code used to manage memory across a product family because different strategies and optimizations may be used in individual products.

Memory resource optimizations may be important even in situations where the entire memory is treated as a single pool. For example, pixmaps in frame buffers have traditionally used variable-sized contiguous chunks of memory, which leads to memory fragmentation. Fragmentation causes available memory to be scattered in small unusable blocks preventing satisfaction of some memory allocation requests, even though the aggregate of the available memory in the small blocks could have satisfied the memory request if the small blocks were contiguous.

Where the memory is shared between the display list and frame buffer, memory optimizations become important in ensuring that each pool has adequate available memory during printer operation and that potentially available memory is not lost due to inefficiencies in allocation. At a global level, the optimization strategies may ensure that memory is allocated between display list and framebuffer memory to meet printer design goals such as cost and/or print speed. In addition, localized display list and framebuffer specific optimizations ensure that optimizations available at a lower level are exploited. In inexpensive printers, efficient memory resource may allow design functionality to be achieved using relatively lower memory. In high-end printers, efficient use of memory may allow for greater real-time availability of memory for printing applications and lead to performance improvements.

Thus, there is a need for systems and methods to manage memory on printers for rasterization, including framebuffer memory that would allow an optimal use of memory resources, while providing a seamless upgrade path.

SUMMARY

Consistent with disclosed embodiments, systems and methods for selecting an optimal memory allocation unit size to facilitate frame buffer memory management are presented. In some embodiments, a method for determining an optimal size for memory allocation units allocated from a memory pool in response to a memory allocation request for a pixmap, wherein the memory pool comprises frame buffer memory and display list memory, comprises determining the amount of unutilized memory when the pixmap is stored using a plurality of memory allocation unit sizes, wherein the memory allocation unit sizes are an integral multiple of a base memory allocation unit; and selecting a memory allocation unit size from the plurality of memory allocation unit sizes based on the amount of unutilized memory.

Embodiments disclosed also relate to methods created, stored, accessed, or modified by processors using computer-readable media or computer-readable memory.

These and other embodiments are further explained below with respect to the following figures.

DETAILED DESCRIPTION

In accordance with embodiments reflecting various features of disclosed embodiments, systems and methods for the automatic storing, manipulating, and processing of a second or intermediate form of printable data generated from a first printable data are presented. In some embodiments, the first printable data may take the form of a PDL description of a document and the intermediate printable data may take the form of a display list of objects generated from the PDL description.

Figure 1:
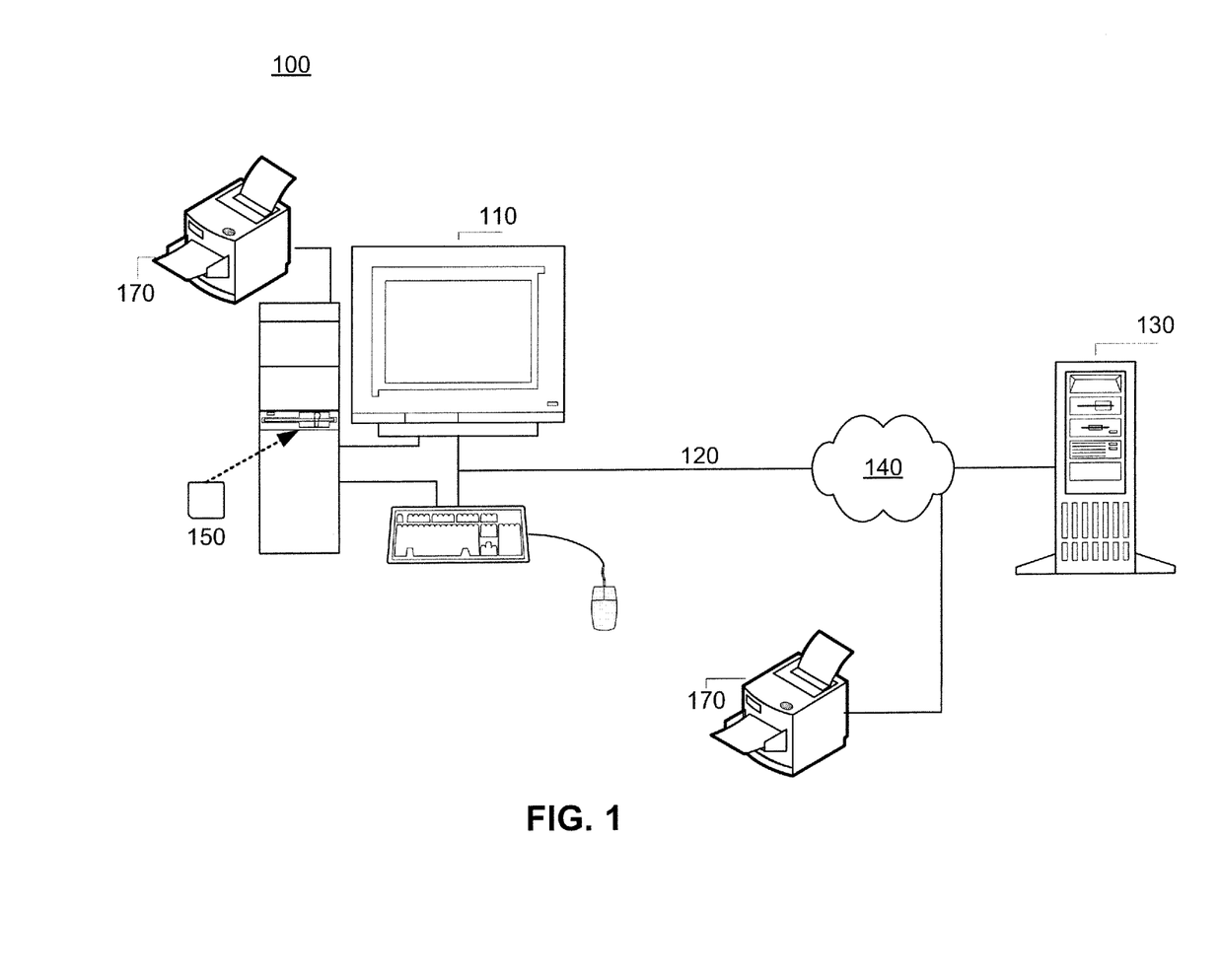
FIG. 1 shows a block diagram illustrating components in a system for printing documents.

FIG. 1 shows a block diagram illustrating components in a system for printing documents. A computer software application consistent with disclosed embodiments may be deployed on a network of computers, as shown in FIG. 1, that are connected through communication links that allow information to be exchanged using conventional communication protocols and/or data port interfaces.

As shown in FIG. 1, exemplary system 100 includes computers including a computing device 110 and a server 130. Further, computing device 110 and server 130 may communicate over a connection 120, which may pass through network 140, which in one case could be the Internet. Computing device 110 may be a computer workstation, desktop computer, laptop computer, or any other computing device capable of being used in a networked environment. Server 130 may be a platform capable of connecting to computing device 110 and other devices (not shown). Computing device 110 and server 130 may be capable of executing software (not shown) that allows the printing of documents using printers 170.

Exemplary printer 170 includes devices that produce physical documents from electronic data including, but not limited to, laser printers, ink-jet printers, LED printers, plotters, facsimile machines, and digital copiers. In some embodiments, printer 170 may also be capable of directly printing documents received from computing device 110 or server 130 over connection 120. In some embodiments such an arrangement may allow for the direct printing of documents, with (or without) additional processing by computing device 110 or server 130. In some embodiments, documents may contain one or more of text, graphics, and images. In some embodiments, printer 170 may receive PDL descriptions of documents for printing. Note, too, that document print processing can be distributed. Thus, computing device 110, server 130, and/or the printer may perform portions of document print processing such as half-toning, color matching, and/or other manipulation processes before a document is physically printed by printer 170.

Computing device 110 also contains removable media drive 150. Removable media drive 150 may include, for example, 3.5 inch floppy drives, CD-ROM drives, DVD ROM drives, CD±RW or DVD±RW drives, USB flash drives, and/or any other removable media drives consistent with disclosed embodiments. In some embodiments, portions of the software application may reside on removable media and be read and executed by computing device 110 using removable media drive 150.

Connection 120 couples computing device 110, server 130, and printer 170 and may be implemented as a wired or wireless connection using conventional communication protocols and/or data port interfaces. In general, connections 120 can be any communication channel that allows transmission of data between the devices. In one embodiment, for example, the devices may be provided with conventional data ports, such as parallel ports, serial ports, Ethernet, USB, SCSI, FIREWIRE, and/or coaxial cable ports for transmission of data through the appropriate connection. In some embodiments, connection 120 may be a Digital Subscriber Line (DSL), an Asymmetric Digital Subscriber Line (ADSL), or a cable connection. The communication links could be wireless links or wired links or any combination consistent with disclosed embodiments that allows communication between the various devices.

Network 140 could include a Local Area Network (LAN), a Wide Area Network (WAN), or the Internet. In some embodiments, information sent over network 140 may be encrypted to ensure the security of the data being transmitted. Printer 170 may be connected to network 140 through connection 120. In some embodiments, printer 170 may also be connected directly to computing device 110 and/or server 130. System 100 may also include other peripheral devices (not shown), according to some embodiments. A computer software application consistent with the disclosed embodiments may be deployed on any of the exemplary computers, as shown in FIG. 1. For example, computing device 110 could execute software that may be downloaded directly from server 130. Portions of the application may also be executed by printer 170 in accordance with disclosed embodiments.

Figure 2:
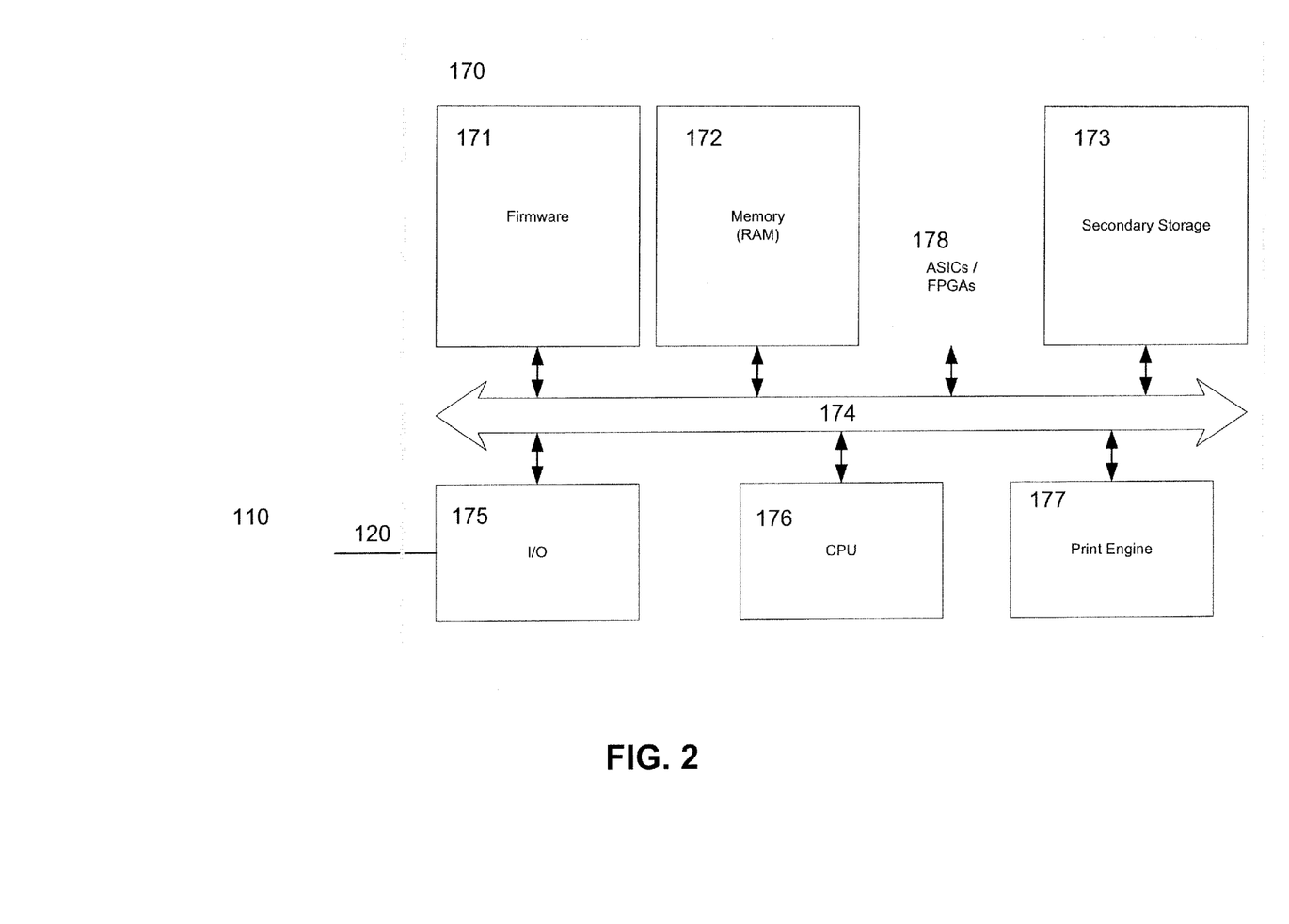
FIG. 2 shows a high level block diagram of an exemplary printer.

FIG. 2 shows a high-level block diagram of exemplary printer 170. In some embodiments, printer 170 may contain bus 174 that couples CPU 176, firmware 171, memory 172, input-output ports 175, print engine 177, and secondary storage device 173. Printer 170 may also contain other Application Specific Integrated Circuits (ASICs), and/or Field Programmable Gate Arrays (FPGAs) 178 that are capable of executing portions of an application to print documents according to disclosed embodiments. In some embodiments, printer 170 may also be able to access secondary storage or other memory in computing device 110 using I/O ports 175 and connection 120. In some embodiments, printer 170 may also be capable of executing software including a printer operating system and other appropriate application software. In some embodiments, printer 170 may allow paper sizes, output trays, color selections, and print resolution, among other options, to be user-configurable.

In some embodiments, CPU 176 may be a general-purpose processor, a special purpose processor, or an embedded processor. CPU 176 can exchange data including control information and instructions with memory 172 and/or firmware 171. Memory 172 may be any type of Dynamic Random Access Memory ("DRAM") such as, but not limited to, SDRAM, or RDRAM. Firmware 171 may hold instructions and data including but not limited to a boot-up sequence, pre-defined routines, memory management routines, and other code. In some embodiments, code and data in firmware 171 may be copied to memory 172 prior to being acted upon by CPU 176. Routines in firmware 171 may include code to translate page descriptions received from computing device 110 to display lists and image bands. In some embodiments, firmware 171 may include routines to rasterize display lists to an appropriate pixmap and store the pixmap in memory 172. Firmware 171 may also include compression routines and memory management routines. In some embodiments, data and instructions in firmware 171 may be upgradeable.

In some embodiments, CPU 176 may act upon instructions and data and provide control and data to ASICs/FPGAs 178 and print engine 177 to generate printed documents. In some embodiments, ASICs/FPGAs 178 may also provide control and data to print engine 177. FPGAs/ASICs 178 may also implement one or more of translation, compression, and rasterization algorithms. In some embodiments, computing device 110 can transform document data into a first printable data. Then, the first printable data can be sent to printer 170 for transformation into intermediate printable data. Printer 170 may transform intermediate printable data into a final form of printable data and print according to this final form, which may take the form of a pixmap. In some embodiments, the first printable data may correspond to a PDL description of a document. In some embodiments, the translation process from a PDL description of a document to the final printable data comprising of a series of lower-level printer-specific commands may include the generation of intermediate printable data comprising of display lists of objects.

In some embodiments, display lists may hold one or more of text, graphics, and image data objects. In some embodiments, objects in display lists may correspond to similar objects in a user document. In some embodiments, display lists may aid in the generation of intermediate or final printable data. In some embodiments, display lists and/or pixmaps may be stored in memory 172 or secondary storage 173. Exemplary secondary storage 173 may be an internal or external hard disk, memory stick, or any other memory storage device capable of being used in printer 170. In some embodiments, the display list may reside on one or more of printer 170, computing device 110, and server 130. Memory to store display lists and/or pixmaps may include dedicated memory or may form part of general purpose memory, or some combination thereof according to some embodiments. In some embodiments, memory may be dynamically allocated to hold display lists and/or pixmaps as needed. In some embodiments, memory allocated to store display lists and/or pixmaps may be dynamically released after processing.

Figure 3:
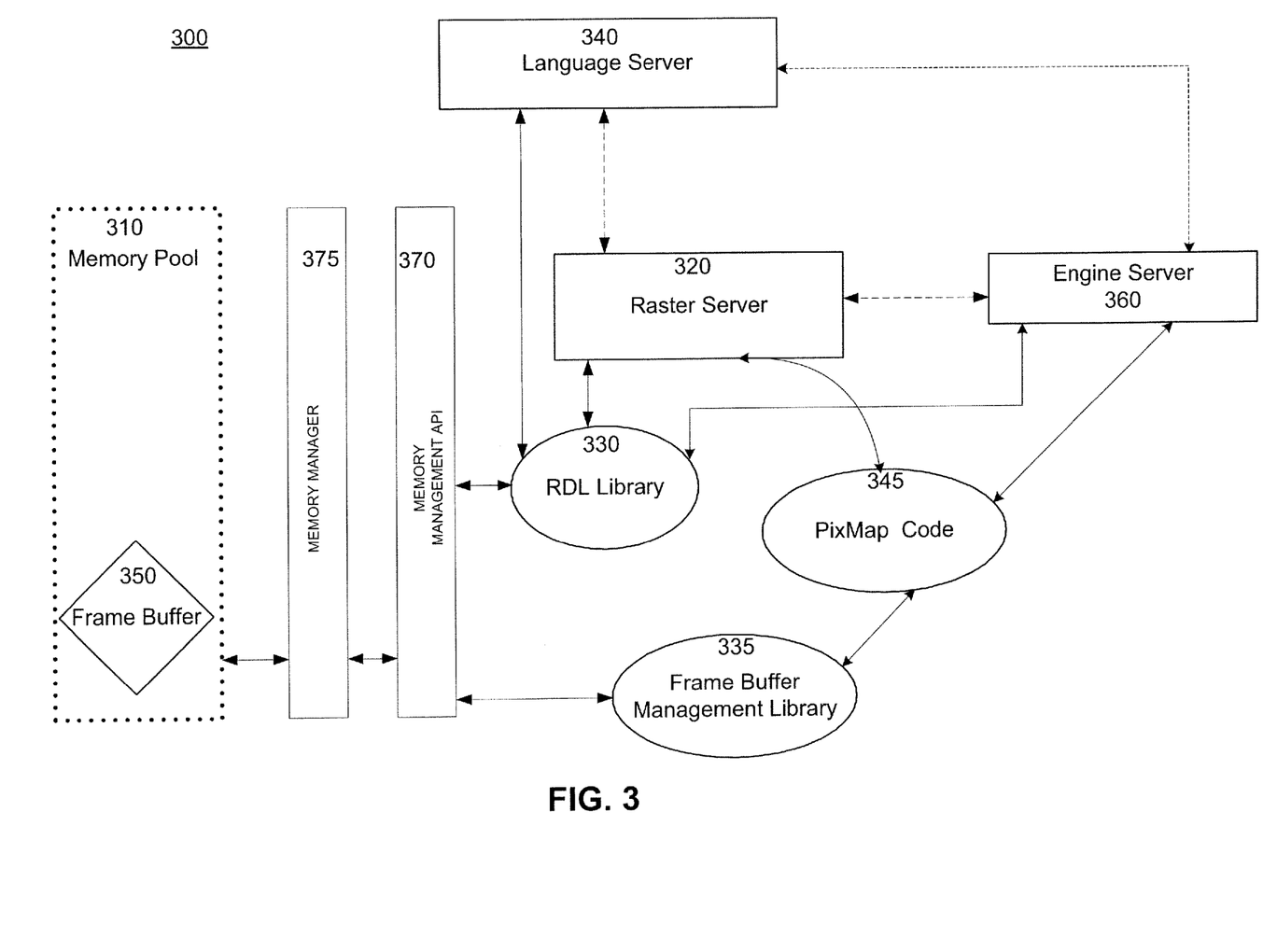
FIG. 3 shows an exemplary high-level architecture of a system for framebuffer management.

FIG. 3 shows an exemplary high-level architecture 300 of a system for framebuffer management. In accordance with disclosed embodiments, architecture 300 permits memory pool 310 to be managed as a single memory pool comprising blocks corresponding to both frame buffer 350 and non-frame buffer blocks. In general, blocks can be viewed as a base memory allocation unit for memory manager 375. In some embodiments, memory may be allocated using either the base memory allocation unit—a block, or some (non-zero, positive) integral multiple of base memory allocation units termed a super-block.

On one hand, memory manager 375 allows memory allocation in blocks to prevent fragmentation, abstracts away implementation details pertaining to memory management, and provides a standard interface through memory management Application Programming Interface ("API") 370 for access to its routines. On the other hand, pixmap code 345 allows pixmaps to be viewed logically as an integral unit while permitting pixmaps to occupy discontiguous memory blocks in memory pool 310 by leveraging the functionality provided by memory manager 375 through memory management API 370 and frame buffer management library 335.

As shown in FIG. 3, language server 340, engine server 360, and raster server 320 may communicate with each other. In addition, language server 340, engine server 360, and raster server 320 may invoke routines and communicate with RDL library 330. The system may also include frame buffer management library 335, which communicates with pixmap code 345; and with raster server 320 and engine server 360 through memory management API 370.

Memory manager 375 allocates and manages memory. Routines in memory manager 375 may be accessed using memory management API 370. Thus, details of memory management code can be abstracted away from program code used to manage and/or manipulate the display list or frame buffer. Similarly, in some embodiments, pixmap code 345 may allow the use and manipulation of pixmaps as a single logical entity, while permitting pixmaps to extend over one or more discontiguous memory blocks. This abstraction can be achieved using frame buffer management library 335 to manage: block and pointer allocation and deallocation for pixmaps; state information pertaining to pixmaps; and to track processes utilizing pixmaps. In some embodiments, pixmap code 345 may enable access to memory blocks for pixmaps. Each memory block or memory allocation unit is a chunk of contiguous memory. Memory blocks may contain one or more scanlines. A scanline is one row of pixels in the image.

In some embodiments, frame buffer management library 335 may allocate memory in blocks. In one embodiment, the blocks may be of equal size. In another embodiment, memory may be allocated either as a block, or as an integral multiple of one or more blocks called a super-block. A super-block is a set of contiguous blocks. For example, frame buffer management library 335 may allocate memory in blocks and super-blocks, where a super-block may comprise four blocks. Super-blocks may be useful to hold larger pixmaps, and also facilitate support for different paper sizes, resolutions, and orientations. For a specific product where paper sizes and other parameters are known, block sizes can be changed to an optimal number that reduces wasted memory.

In some embodiments, use of functionality provided by memory manager 375 may occur through a memory management application API 370. For example, frame buffer management library 335 may use memory manager 375 to obtain blocks and pointers, using interfaces specified in the memory management API 370. Memory manager 375 defines the functions of the memory management API 370. In some embodiments, code pertaining to display lists and the frame buffer 350, such as code in frame buffer management library 335, interface with memory manager 375 through memory management API 370. Accordingly, in these embodiments, the memory manager can be replaced or easily modified by a product-specific memory manager without changing program code used to manage and/or manipulate the display list or frame buffer.

In some embodiments, the display list may include commands defining data objects and their contexts within a document or a page within the document to be printed. These display commands may include data comprising characters or text, line drawings or vectors, and images or raster data.

In some embodiments, the display list may be dynamically reconfigurable and is termed a Reconfigurable Display List ("RDL"). In one embodiment, an RDL may be implemented using a data structure that allows certain display list objects to be stored in a manner that allows their manipulation dynamically. For example, image objects may be compressed in place to increase the amount of available memory, and decompressed when referenced and/or used. In some embodiments, an RDL may also permit RDL objects to be stored in memory and/or secondary storage by holding pointers, offsets, or addresses to the actual locations of RDL objects, which can then be retrieved when referenced and/or used. In general, the RDL allows display list objects to be flexibly stored and manipulated based on system constraints and parameters.

In one embodiment, the translation of a PDL description of a document into a display list and/or RDL representation may be performed by language server 340 using routines in RDL library 330 and memory manager 375. For example, language server 340 may take PDL language primitives and transform these into data and graphical objects and add these to the reconfigurable display list using the capability provided by functions in RDL library 330 and memory manager 375. In one embodiment, the display list may be stored and manipulated in a dynamically allocated memory pool such as exemplary memory pool 310, which may be part of memory 172.

In some embodiments, creation of the RDL may be an intermediate step in the processing of data prior to actual printing. The RDL may be parsed before conversion into a subsequent form. In some embodiments the subsequent form may be a final representation, and the conversion process may be referred to as rasterizing the data. For example, rasterization may be performed by raster server 320 using routines in frame buffer management library 335 and pixmap code 345. Upon rasterization, the rasterized data may be stored in frame buffer 350, which may be part of memory pool 310, using routines in memory manager 375, which may be accessed through memory management API 370. In one embodiment, the rasterized data may take the form of a bitmap or pixmap that specifies the marks to be made on a printed page.

In one embodiment, routines in memory manager 375 may manage some subset of available memory in memory 172 as memory pool 310 and allocate memory from memory pool 310 to requesting processes through memory management API 370. When memory is no longer needed by the requesting processes, the memory may be de-allocated and returned to memory pool 310, where it can be made available to other processes. Thus, exemplary memory manager 370 may also provide various other memory management functions, including routines to free memory, routines to recover memory, and swapping routines that can swap memory to secondary storage 173.

In some embodiments, frame buffer 350 may also be a part of memory pool 310 and may be managed by memory manager 375. For example, calls to functions in frame buffer management library 335, may result in calls to functions in memory management API 370. Memory management API may then invoke one or more functions in memory manager 375. Results of the actions taken by memory manager 375 may be routed back to the calling process. In one embodiment, frame buffer 350 may be allocated an initial contiguous block of memory and subsequent memory blocks may be allocated to frame buffer 350 when requested. Memory blocks may also be allocated for other non frame-buffer purposes from memory pool 310. In some embodiments, distinct memory blocks assigned to the frame buffer 350 or to other processes may occupy non-contiguous memory locations in memory 172.

Print engine 177, may process the rasterized data in frame buffer 350, and form a printable image of the page on a print medium, such as paper using routines in frame buffer library 335. In some embodiments, raster server 320 and engine server 360 may also use routines in RDL library 330 and pixmap code 345 to perform their functions. For example, routines in pixmap code 345 may provide raster server 320 with access to pixmap routines to support rasterization. In one embodiment, routines in pixmap code 345 may permit a final pixmap comprising one or more color plane components, and an alpha plane component to be utilized by print engine 177 through engine server 360.

In some embodiments, engine server 360 may provide control information, instructions, and data to print engine 177. In some embodiments, engine server 360 may invoke routines that lead to freeing memory used by framebuffer objects after processing for return to memory pool 310, using functionality provided by memory manager 375, through pixmap code 345, frame buffer library 335, and memory management API 370. Routines in pixmap code 345 may provide engine server 360 with access to scanlines for a pixmap. In some embodiments, portions of memory pool 310 and/or frame buffer 350 may reside in memory 172 or secondary storage 173.

In some embodiments, routines for language server 340, raster server 320, and engine server 360 may be provided in firmware 171 or may be implemented using ASICs/FPGAs 178.

Figure 4:
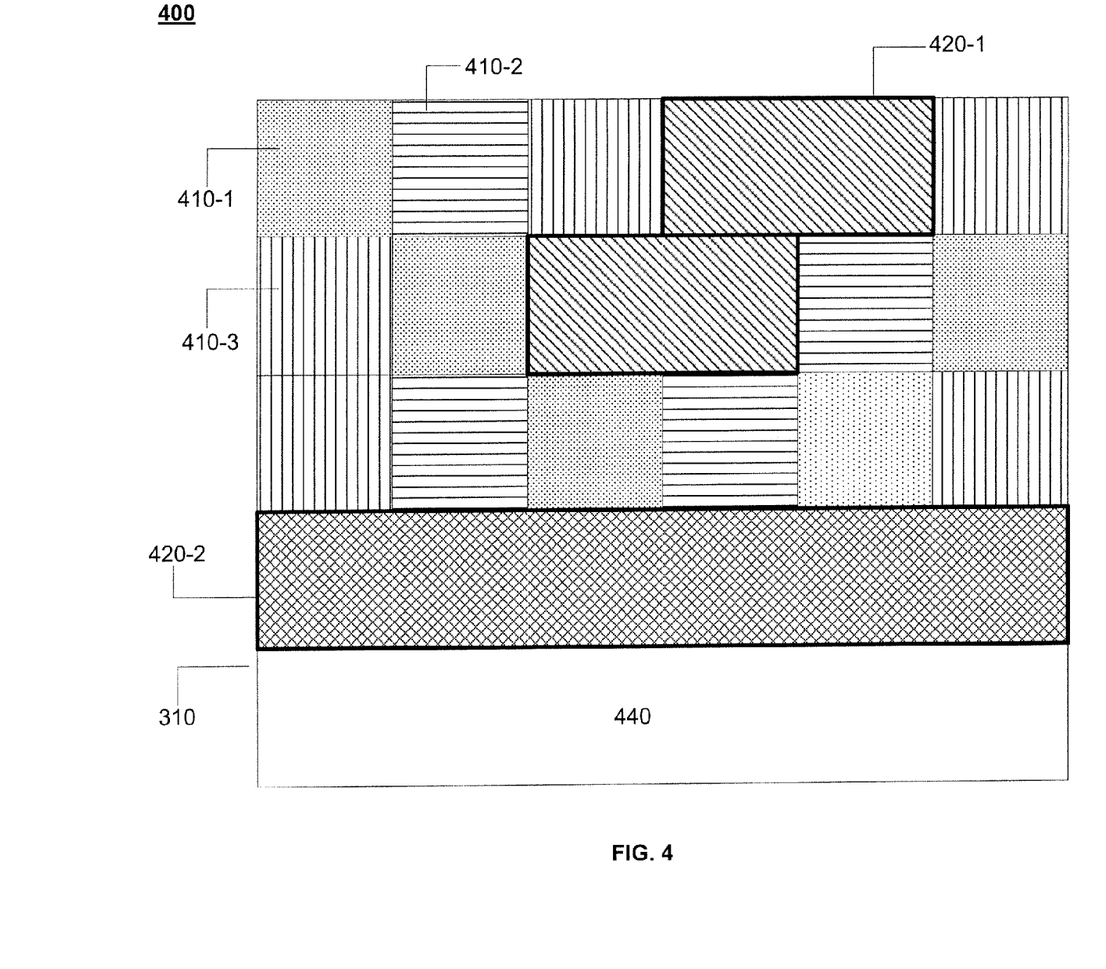
FIG. 4 shows a snapshot 400 illustrating an exemplary allocation of a portion of memory pool 310 during rasterization.

FIG. 4 shows a snapshot 400 illustrating an exemplary allocation of a portion of memory pool 310 during rasterization. At various points during rasterization, memory pool 310 may comprise of some combination of blocks 410, super-blocks 420, and unallocated memory 440. From a logical perspective, memory pool 310 may be viewed initially as unallocated memory 440, or a collection of free blocks 410. As shown in FIG. 4, memory comprises blocks 410-1, 410-2, 410-3, and super-blocks 420-1, and 420-2, which may correspond to five distinct pixmaps A, B, C, D, and E, respectively as indicated by the distinct patterns.

When memory is requested for use by frame buffer 350, such as for storing a pixmap, a block 410 or super-block 420 may be allocated. Super-block 420 is a contiguous chunk of memory comprising an integral multiple of one or more blocks 410. When memory is requested for an RDL, or for temporary storage and processing purposes, a block 410 may be allocated. As shown in FIG. 4, pixmaps A, B, and C are dispersed among discontiguous memory blocks 410 scattered throughout memory 172. In some embodiments, memory defragmentation routines may be employed periodically, or when available memory is below some threshold, or as a strategy to free memory, in order to create new super-blocks 420 from disparate scattered blocks 410 in memory pool 310. For example, objects in memory may be rearranged and disparate scattered blocks combined to create larger contiguous memory sections.

In some embodiments, defragmentation may also be decreased through the use of super-blocks 420. In some embodiments, the size of super-block allocation units may be varied to optimize memory utilization. For example, as shown in FIG. 4, pixmap D uses allocation units comprising super-blocks 420-1, where each super-block 420-1 is the size of two blocks. Similarly, pixmap E uses allocation units comprising super-blocks 420-2, where each super-block 420-2 is the size of six blocks.

In some embodiments, super-block 420 can be allocated when memory is requested so that when a single block 410 is requested, a super-block 420 may be allocated instead. Accordingly, one or more blocks that constitute allocated super-block 420 may be unused initially. As additional single blocks 410 are requested, any unused blocks from the previously allocated super-block can be provided to the requester until none remain, at which time another super-block can be allocated. In some embodiments, the breaking up of frame-buffer 350 into discontiguous allocation units permits the efficient use of memory. For example, when a single scanline is accessed, allocation units in the pixmap that do not contain the scanline of interest can be subjected to memory conservation or recovery schemes to increase the amount of available memory. For example, allocation units may be swapped to disk, or compressed, to increase the availability of memory.

Figure 5:
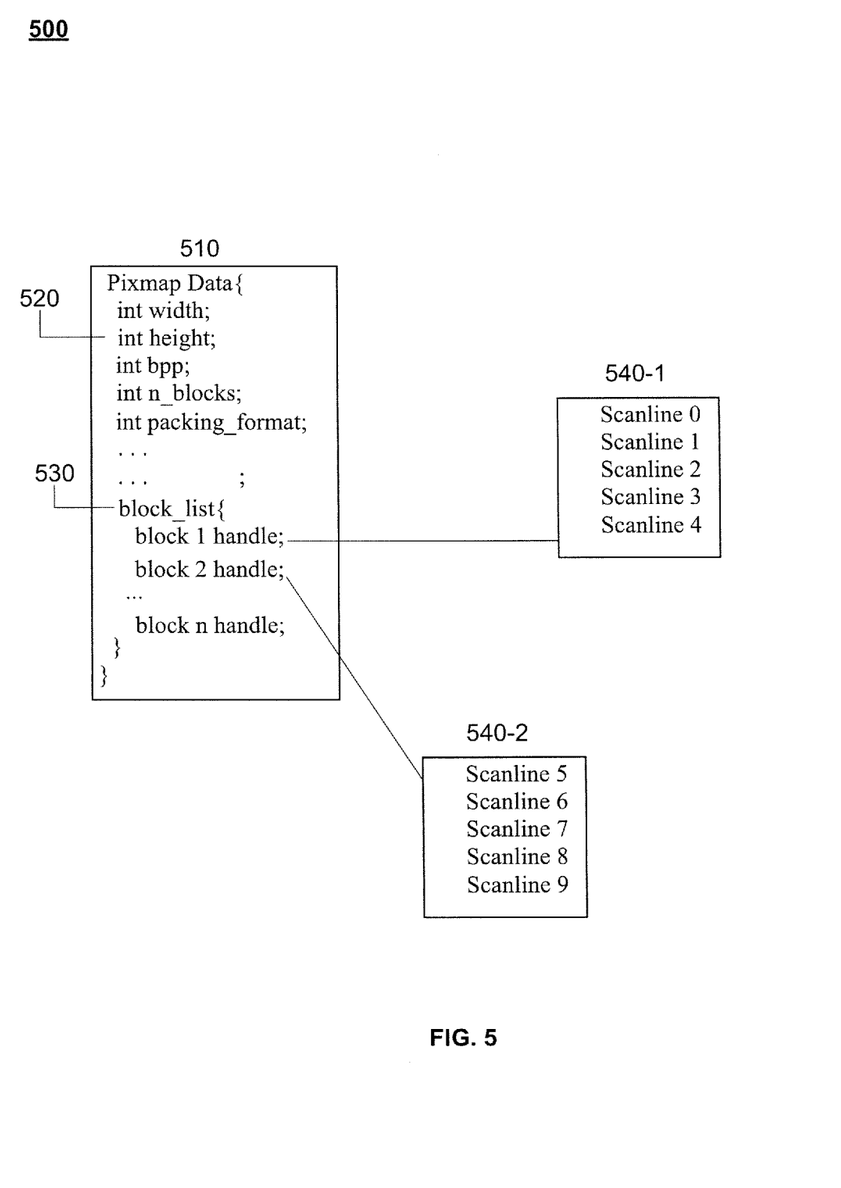
FIG. 5 shows a block diagram 500 illustrating an exemplary data structure for a pixmap object 510.

FIG. 5 shows a block diagram 500 illustrating some portions of an exemplary data structure for a pixmap object 510. Pixmap object 510 may be used and operated upon by routines in pixmap code 345. In some embodiments, pixmap object 510 may be characterized by internal information 520 pertaining to pixmap object 510, such as the width and height of the underlying image in pixels and by the number of bits per pixel or color depth. The color depth determines the number of colors that each pixel can represent. Internal information 520 may also include fields that store other information about the pixmap such as number of component planes, size in bits of each component, the packing format used to pack pixmap elements, etc.

Pixmap object 510 may also include block list 530, which can hold information pertaining to blocks 410 or super blocks 420, corresponding to a given pixmap. Exemplary block list 530 may comprise one or more block handles, shown as block_handle_1 through block_handle_n. In some embodiments, each block handle may provide access to one or more scanlines in block 410 or super block 420. Block list 530 may also include data fields that hold pointers to blocks in the list. For example, a data structure associated with each block may hold pointers to the immediately succeeding and/or preceding block. In some embodiments, block list 530 may also be implemented as a dynamic array, which can be resized and also allows elements to be added or removed.

In some embodiments, the number of scanlines held by block 410 or super block 420 may be determined by the size of the allocated unit and other system parameters. For example, each block 410 corresponding to a pixmap may comprise $S_{max}$ scanlines. However, the last block 410 for the pixmap may hold less than $S_{max}$ scanlines. As shown in FIG. 5, each block 410 holds five ($S_{max}$=5) scanlines. In some embodiments, a scanline may be divided further into components, including one or more of component planes, an alpha component, etc. For example, a pixel for a color image may comprise Cyan, Magenta, Yellow, and Black ("CMYK") components.

Figure 6:
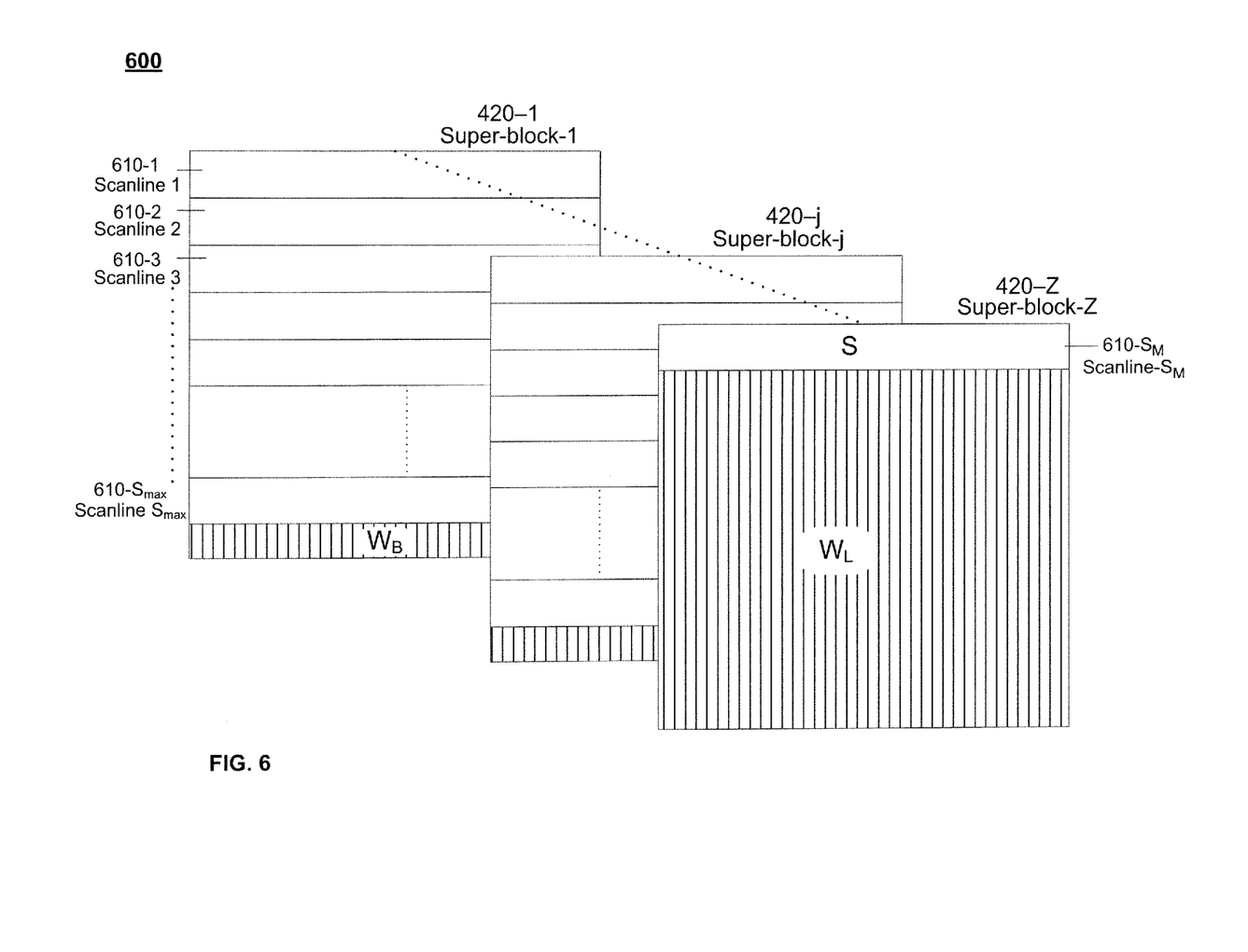
FIG. 6 shows an exemplary memory organization 600 for pixmap P comprising scanlines 610 distributed across Z super-blocks 420-1 through 420-Z.

FIG. 6 shows a memory organization 600 for pixmap P comprising scanlines 610, which may each comprise S bytes of memory, distributed across Z super-blocks 420-1 through 420-Z. Pixmap P may comprise of a total of M scanlines, therefore at least S*M bytes of memory may be occupied when the entire pixmap P is stored. Z is the number of super-blocks used to hold pixmap P. As shown in FIG. 6, super-block 420 may comprise one or more scanlines 610.

For a given size, super-block 420 may be capable of holding a maximum of $S_{max}$ scanlines of S bytes each. Because the size of super-block 420 may not be an integral multiple of scanline size S, some memory $W_B$ may not be utilized in each super-block 420 (with the possible exception of the last super-block 420-Z, where a different amount of memory may remain unutilized). FIG. 6 shows exemplary super-block 420-1 comprising of $S_{max}$ scanlines 610-1 through 610-$S_{max}$. Since super-blocks 420 may be allocated as a unit, the last super-block 610-Z may contain less than $S_{max}$ scanlines, and therefore contain an amount $W_L$ of unutilized space. Thus, depending on the size of scanline 610 and size of super-block 420, pixmap P may use more than S*M bytes of memory. Routines in memory manager 375, frame buffer management library 335, and pixmap code 345 may be used to manage the allocation of superblocks 420 to optimize memory usage by pixmap P.

Figure 7:
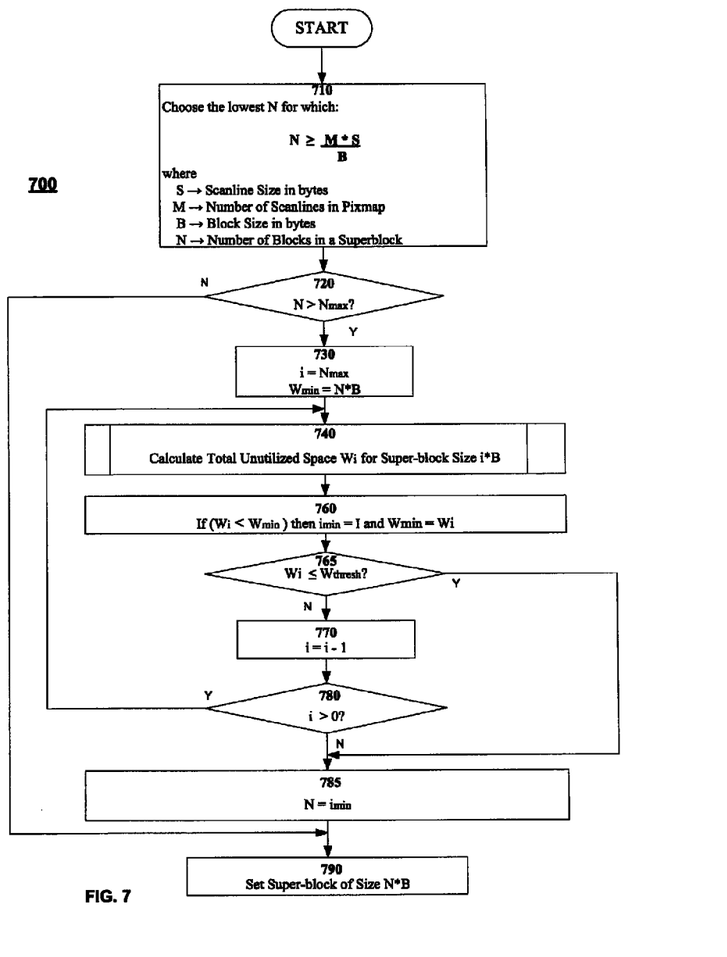
FIG. 7 shows a flowchart 700 for an exemplary method to optimize memory usage for a pixmap by selecting an optimal size for superblock 420.

FIG. 7 shows a flowchart 700 for an exemplary method to optimize memory usage for a pixmap by selecting an optimal size for superblock 420. The method in flowchart 700 may be used to determine an integer N (N>0), where N*B represents an optimal size for superblock 420 and B represents the size of block 410. At least M*S bytes of memory may be used to hold Pixmap P, which comprises M scanlines 610 of size S.

In step 710, the algorithm may determine a value for N, where N is the smallest integral multiple of blocks capable of holding pixmap P. Accordingly, in step 710, N may be computed as $$N \geq \frac{M*S}{B}, \quad (1)$$

where N is the smallest integer for which equation (1) is true. The value of N above will optimize usage of memory by pixmap P by minimizing unutilized space.

However, depending on system parameters, it may be advantageous to restrict the maximum size of a superblock i.e. place an upper limit $N_{max}$ on the number of contiguous blocks N that may comprise super-block 420. Accordingly, in step 720, the value of N computed according to equation (1), is compared with $N_{max}$. If N≤$N_{max}$, then the algorithm proceeds to step 790, where the size of superblock 420 is set as N*B.

If the value of N computed according to equation (1) exceeds $N_{max}$, then in step 730, the value of an iteration counter i may be initialized to $N_{max}$, and the value of a variable $W_{min}$, which keeps track of lowest amount of unutilized space for superblock sizes already considered by the algorithm, can be initialized to N*B or some other sufficiently large number.

In routine 740, the algorithm may calculate the unutilized space $W_i$ for superblock size (i*B). Next, in step 760, $W_i$ may be compared with the current value of $W_{min}$. If the current value of $W_i$ is less than that of $W_{min}$, then $W_{min}$ may be assigned the value of $W_i$, and the current value of i may be assigned to $i_{min}$.

Next, in step 765, the current value of $W_i$ can be compared to $W_{thresh}$. $W_{thresh}$ may hold a threshold value that corresponds to a maximum value of allowable unutilized space. The value of $W_{thresh}$ may vary among printing systems and may depend on system parameters. For example, a low value of $W_{thresh}$ may be set, if memory available on printer 170 is limited. In some embodiments, the value of $W_{thresh}$ may be based on heuristic data that may be collected by experimentation. In some methods, an initial value for $W_{thresh}$ may be updated based on information collected during the operation of printer 170. For example, $W_{thresh}$ may be set to the average unutilized memory in pixmaps, or to the average unutilized memory for the last five pixmaps, or to other values using various statistical and heuristic techniques. In some embodiments, the user may be able to specify the value of $W_{thresh}$ through a user-interface that provides a menu of available optimizations. In step 765, if the value of $W_i$ is below the value of $W_{thresh}$, the algorithm may proceed directly to step 785, where N is assigned the value of $i_{min}$. Setting an appropriate value for $W_{thresh}$ allows the algorithm to converge faster to choose an optimal superblock size.

If $W_i$ exceeds $W_{thresh}$, then the value of i may be decremented in step 770 and checked to see if i exceeds zero, in step 780. If i equals zero, the algorithm proceeds to step 785, where N is assigned the value of $i_{min}$. If, in step 780, i is greater than 0, then the algorithm iterates through steps 740-780.

In step 790, the size of superblock 420 is set as N*B. Note that algorithm 700 may be modified to handle a variety of situations. For example, when the memory manager is structured to use either block size B, or some predetermined super-block size N*B, then $W_{min}$ may be calculated for these two values and no calculation may be performed for other block sizes. Further, when superblocks 420 can be allocated in various integral multiples of block size, the size of the last superblock 420-Z may be different from the size of the earlier superblocks 420 to minimize wastage. For example, if the last superblock 420-Z comprises a single scanline, then a block 410 may be allocated to hold the last scanline, thereby reducing unutilized memory. A variety of the other schemes will be apparent to one of reasonable skill in the art and the algorithm depicted in exemplary flowchart 700 may be modified appropriately.

Figure 8:
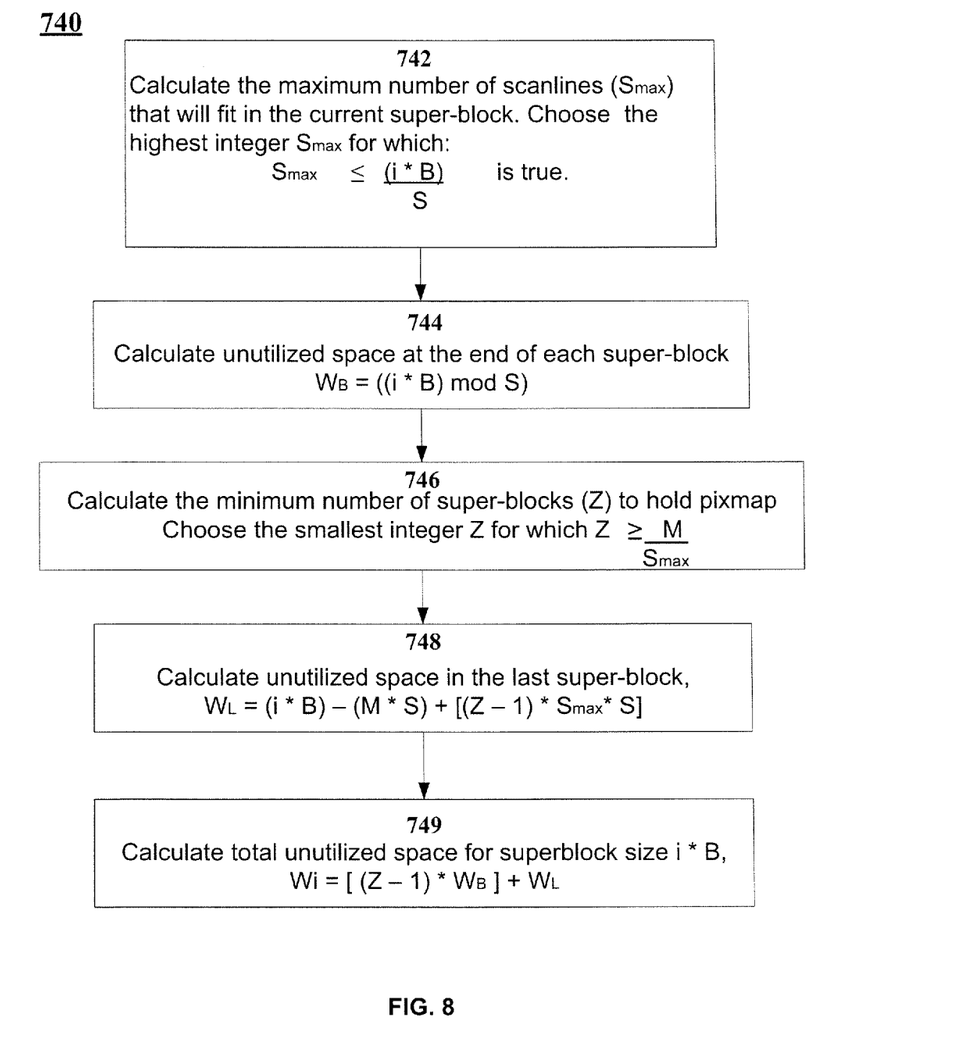
FIG. 8 shows a flowchart for exemplary routine 740 to calculate the unutilized space for a given superblock size.

FIG. 8 shows a flowchart for exemplary routine 740 to calculate the unutilized space for a given superblock size. FIG. 8 uses the same symbols when referring to entities described in FIG. 7. The algorithm calculates the total unutilized space to hold pixmap P by calculating the unutilized space in each superblock 420 (except the last) and adding it to the unutilized space in the last superblock 420-Z.

In step 742, the algorithm calculates the maximum number of scanlines $S_{max}$ that can be held by superblock 420 of size i*B. $S_{max}$ may be calculated as the highest integer that satisfies, $$S\max \leq \frac{i*B}{S}, \quad (2)$$

where i is the current value of the iteration counter, B is the block size, and S is the size of each scanline.

In step 744, the unutilized space at the end of each superblock is calculated as $$W_B = (i*B) \bmod S \quad (3),$$

where "mod" refers to the modulus operator, which yields the remainder after division. In step 746, the minimum number of superblocks Z capable of holding the entire pixmap P is calculated as the smallest integer Z such that, $$Z \geq \frac{M}{S\max}, \quad (4)$$

where M is the total number of scanlines in pixmap P.

Next, in step 748, the unutilized space in the last superblock 420-Z is calculated by subtracting the bytes occupied by scanlines in the last block from the size (i*B) of superblock 420-Z. The number of bytes occupied by scanlines in the last block may be determined by subtracting the size of pixmap P=(M*S) from the bytes used by scanlines in first (Z−1) blocks, which is (Z−1)*$S_{max}$*S. Accordingly, the unutilized space $W_L$ in the last block may be calculated as:

$$W_L = (i*B) - (M*S) + [(Z-1)*S\max*S] \quad (5).$$

Next, in step 749, the total unutilized space $W_i$ is calculated as the sums of unutilized space in individual superblocks 420, which is (Z−1)*$W_B$, and the unutilized space $W_L$ in the last superblock 420-L. Therefore, $$W_i = [(Z-1)*W_B] + W_L \quad (6).$$

The value of $W_i$ calculated in routine 740 may be used in the method depicted in exemplary flowchart 700.

Other implementations will be apparent to those skilled in the art from consideration of the specification and practice of disclosed embodiments. It is intended that the specification and examples be considered as exemplary only, with its true scope and spirit being indicated by the following claims.

What is claimed is:

1. A method performed by a processing unit for determining an optimal size for memory allocation blocks allocated from a memory pool in response to a memory allocation request for a pixmap, wherein the memory pool comprises frame buffer memory and display list memory, the method comprising:
    determining, by the processing unit, a first amount and a second amount of unutilized memory associated with storing the pixmap using a memory allocation block of a first size and a second size respectively, wherein:
        the first size and the second size are each a different integral multiple of a size of a base memory allocation block, and
        the base memory allocation block is a contiguous unit of memory holding one or more scanlines of the pixmap;
    comparing the first amount of unutilized memory with at least the second amount of unutilized memory; and
    selecting a memory allocation block size from a plurality of memory allocation block sizes based on at least the comparison between the first amount and the second amount of unutilized memory.

2. The method of claim 1, wherein the selected memory allocation block size is the minimum integral multiple of the base allocation block size that exceeds the size of the pixmap.

3. The method of claim 1, wherein the selected memory allocation block size is limited by an upper threshold on the integral multiplier of the base memory allocation block size.

4. The method according to claim 3, wherein the selected memory allocation block size is one that minimizes total amount of unutilized memory when the pixmap is stored.

5. The method according to claim 3, wherein the selected memory allocation block size is one that results in an amount of unutilized memory associated with storing the pixmap using the selected memory allocation block size being lower than or equal to a specified unutilized memory threshold.

6. The method according to claim 5, wherein the unutilized memory threshold is specified using user-selectable heuristic methods.

7. The method according to claim 1, wherein the plurality of memory allocation unit sizes comprise the base memory allocation block size and a fixed integral multiple of the base allocation block size.

8. The method of claim 1, wherein all allocated memory allocation blocks are of equal size.

9. The method of claim 1, wherein each individual memory allocation block comprises a contiguous section of memory.

10. The method of claim 1, wherein the method is performed by the processing unit in communication with a printer.

11. The method of claim 1, wherein the single memory pool is resident on a printing device.

12. A non-transitory computer-readable medium comprising instructions, which when executed by a processor, perform steps in a method for determining an optimal size for memory allocation blocks allocated from a memory pool in response to a memory allocation request for a pixmap, wherein the memory pool comprises frame buffer memory and display list memory, the steps comprising:
    determining a first amount and a second amount of unutilized memory associated with storing the pixmap using a memory allocation block of a first size and a second size respectively, wherein:
        the first size and the second size are each a different integral multiple of size of a base memory allocation block, and
        the base memory allocation block is a contiguous unit of memory holding one or more scanlines of the pixmap;
    comparing the first amount of unutilized memory with at least the second amount of unutilized memory; and
    selecting a memory allocation block size from the plurality of memory allocation block sizes based on at least the comparison between the first amount and the second amount of unutilized memory.

13. The computer-readable medium of claim 12, wherein the selected memory allocation block size is the minimum integral multiple of the base allocation block size that exceeds the size of the pixmap.

14. The computer-readable medium of claim 12, wherein the selected memory allocation block size is limited by an upper threshold on the integral multiplier of the base memory allocation block size.

15. The computer-readable medium according to claim 14, wherein the selected memory allocation block size is one that minimizes a total amount of unutilized memory when the pixmap is stored.

16. The computer-readable medium according to claim 14, wherein the selected memory allocation block size is one that results in an amount of unutilized memory associated with storing the pixmap using the selected memory allocation block size being lower than or equal to a specified unutilized memory threshold.

17. The computer-readable medium according to claim 16, wherein the unutilized memory threshold is specified using user-selectable heuristic methods.

18. The computer-readable medium according to claim 12, wherein the plurality of memory allocation unit sizes comprise the base memory allocation block size and a fixed integral multiple of the base allocation block size.

19. The computer-readable medium of claim 12, wherein all allocated memory allocation blocks are of equal size.

20. A non-transitory computer-readable memory comprising instructions, which when executed by a processor, perform steps in a method for determining an optimal size for memory allocation blocks allocated from a memory pool in response to a memory allocation request for a pixmap, wherein the memory pool comprises frame buffer memory and display list memory, the steps comprising:
- determining a first amount and a second amount of unutilized memory associated with storing the pixmap using memory allocation blocks of a first size and a second size respectively, wherein:
  - the first size and the second size are each a different integral multiple of a size of a base memory allocation block, and
  - the base memory allocation block is a contiguous unit of memory holding one or more scanlines of the pixmap;
- comparing the first amount of unutilized memory with at least the second amount of unutilized memory; and
- selecting a memory allocation block size from the plurality of memory allocation block sizes based on at least the comparison between the first amount and the second amount of unutilized memory.

* * * * *